Feb. 21, 1956  C. S. BAILEY  2,735,620
THERMOSTATICALLY OPERABLE VALVE MECHANISMS
Filed Jan. 14, 1952

Inventor
Charles S. Bailey
By Willits, Helwig & Baillie
Attorneys

United States Patent Office 2,735,620
Patented Feb. 21, 1956

2,735,620

THERMOSTATICALLY OPERABLE VALVE MECHANISMS

Charles S. Bailey, Lockport, N. Y., assignor to General Motors Corporation, Detroit, Mich., a corporation of Delaware Application January 14, 1952, Serial No. 266,268

16 Claims. (Cl. 236—34)

This invention relates to thermostatically operable valve mechanisms adapted for use in liquid coolant systems for internal combustion engines and more particularly to valve mechanisms having temperature and pressure compensating means associated therewith.

Many of the fluid coolant systems for internal combustion engines have pressure radiator caps associated therewith which prevent the escape of liquid or vapor from the system until the pressure therein reaches a predetermined value. This pressure generated in coolant systems may vary from three to approximately fourteen pounds per square inch. It is well known that for each increase in pressure of one pound per square inch in such systems the temperature thereof increases approximately 3° F. Consequently, in a system employing a relief pressure cap designed to maintain a pressure in the system, for example, of thirteen pounds per square inch, the temperature increase in the system as a result of pressure alone equals approximately 39° F. Consequently, if the usual vapor operable type of thermostats are employed which, for example, are designed to open the associated valve at 160° F., at atmospheric pressure, it is apparent that should the system pressure increase to substantially thirteen pounds per square inch, the start to open temperature will be increased to approximately 199° F. The vapor in such thermostats is compressible with no increase in internal pressure and therefore the pressure in the coolant circulating system forces the associated valve closed and retains it closed until the higher temperature of 199° is exceeded. Should anti-freeze liquids be employed in the coolant system having a lower boiling point than water, considerable loss would occur, as a result of nonopening of the valve at the proper start to open temperature.

One object of the invention is to provide an improved thermostatically operable valve mechanism which functions to actuate the valve toward open position when the temperature reaches a predetermined value regardless of the pressure in the associated system.

Another object is to provide in a device of the stated character means for compensating for a predetermined temperature rise in the associated system.

A further object is to provide in a thermostatically operable valve mechanism of the stated character, means for balancing the associated valve against the ambient pressure to which it is subjected.

A still further object is to provide a temperature controlled device comprising a valve, an expansible element for operating said valve which is completely filled with a thermostatic liquid having such properties as to remain in liquid form throughout a predetermined temperature range, and means associated with said valve for absorbing the expansion of said liquid throughout said range, whereby actuation of said valve toward open position begins only when the temperature therein exceeds the highest temperature of said predetermined range.

A still further object is to provide a thermostatically controlled valve mechanism of the stated character which is simple in construction, economic in manufacture and highly efficient in operation.

Other and further objects will become apparent as the description of the invention progresses.

Figure 1:
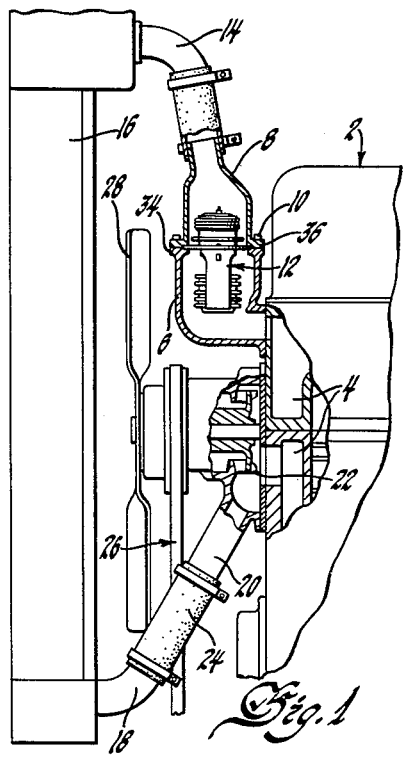
Fig. 1 is a side elevational view, partly in section, of one end of an internal combustion engine showing the coolant circulating system asosciated therewith, certain of the parts thereof being broken away to more clearly shown certain features thereof.

Referring to the drawings, the numeral 2 designates generally an internal combustion engine having a liquid coolant jacket 4 associated therewith. The upper end of jacket 4 has secured thereto a fitting 6 to which a second fitting 8 is secured by bolts 10. A thermostatically operable valve mechanism 12 is secured between fittings 6 and 8. The upper end of fitting 8 is connected to the inlet spout 14 of a coolant radiator indicated generally at 16. The return spout 18 of radiator 16 is connected to a fitting 20 attached to the casing of a fluid circulating pump 22 by a flexible pipe connection 24. Pump 22 is driven from the engine crank shaft (not shown) by a belt and pulley mechanism 26. Belt and pulley mechanism 26 also operates a fan 28 which draws cooling air through the radiator 16 in a well known manner. As is well known in coolant circulating systems of the type shown herein, a thermostatically operable valve is provided to prevent circulation of the coolant through the radiator until the temperature of the coolant reaches a predetermined value. When the valve opens the coolant is permitted to circulate from the engine jacket to the radiator and thus the desired temperature of the coolant is maintained.

Thermostatically operable valve mechanism 12, comprises, a supporting frame 30 having a flange 32 at the upper end thereof which may be circular in shape to conform with the top of fitting 6. Flange 32 is secured between the companion flanges 34 and 36 of fittings 6 and 8, respectively, when the bolts 10 are tightened. The flange 32 terminates at its inner end in an annular vertically extending flange 38. Flange 38 is provided with external threads 40 which are adapted to engage the internal threads 42 provided on an annular valve seat 44. By turning valve seat 44 the latter may be adjusted toward and from an associated valve element 46. Valve element 46 is of circular construction and has provided at the inner end thereof an internally threaded portion 48 which threadedly engages the upper threaded portion 50 of a valve stem 52. The lower end of valve stem 52 is secured to the upper movable head 54 of a bellows type thermostat 56 in any suitable manner such as by spinning or peening the lower end over the edge of the opening provided in said movable head. The lower portion of supporting frame 30 is substantially U-shape in construction having a base or web portion 58 and vertically extending legs 60 and 62. The upper ends of legs 60 and 62 extend through slots provided in flange 32 and the upper ends thereof are peened over to effectively secure the parts in position. The lower member 58 of frame 30 constitutes a support for the fixed end 64 of thermostat 56. Thermostatically operated valve mechanisms as thus far described are known in the art. In order to balance the pressure on the valve element 46 imposed by the pressure of the fluid in the coolant circulating system and to absorb the initial expansion of the thermostatic fluid, a compensating mechanism has been provided. As shown in the drawing, the lower or fixed head 66 of a second bellows thermostat 68 is secured to the top of valve element 46. The movable head 70 of thermostat 68 has provided centrally thereof an opening through which the upper end of a filler tube 72 extends. Filler tube 72 extends through a vertical passage 74 extending longitudinally of valve stem 52 and has secured to the lower end thereof a circular disc 76.

Figure 2:
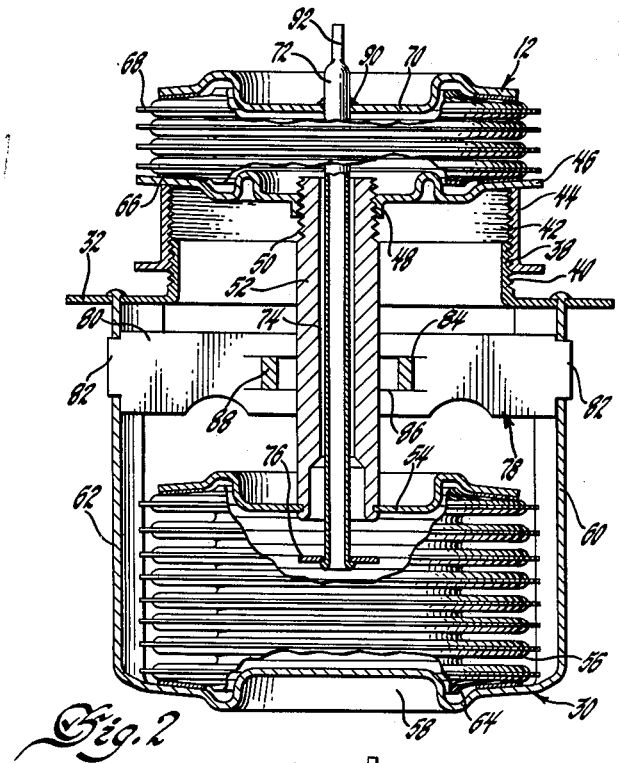
Fig. 2 is a sectional elevational view taken through a thermostat showing the arrangements of the parts before expansion of the thermostatic liquid therein takes place.
Figure 3:
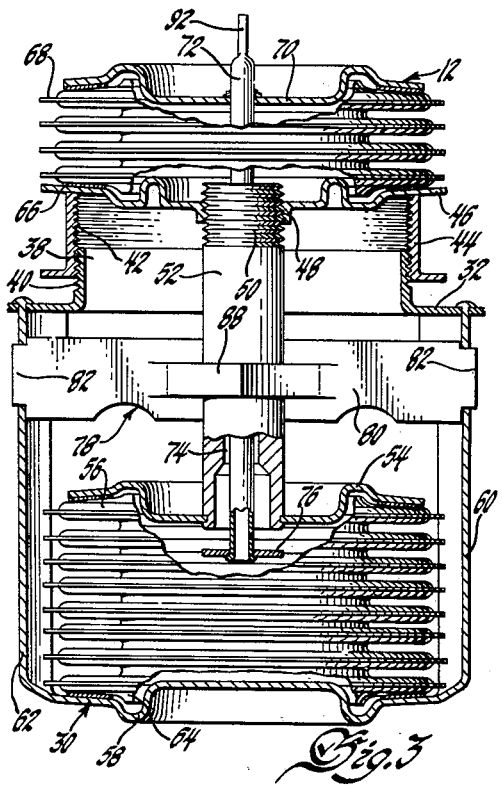
Fig. 3 is a view similar to Fig. 2 showing the position of the parts at the start to open position of the associated valve.
Figure 4:
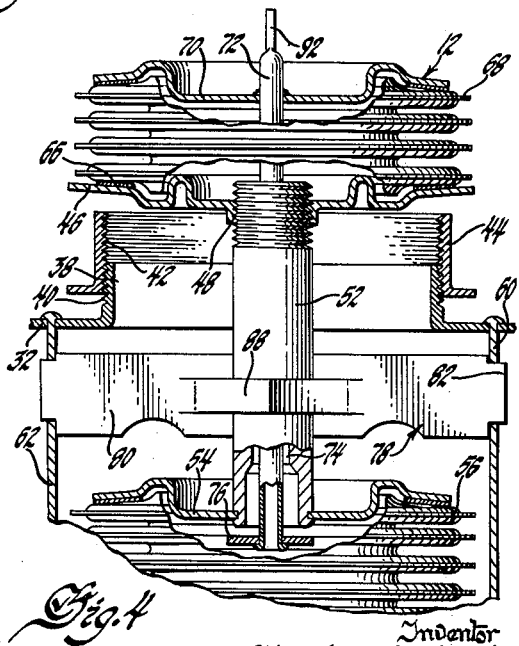
Fig. 4 is a view similar to Figs. 2 and 3 showing the position of the parts when the associated valve is in wide-open position.

In order to guide valve 46 and stem 52 during operation by bellows 56, a bracket 78 is provided. As shown in the drawing, guide bracket 78 comprises a transverse bar 80 having reduced portions 82 provided at the opposite ends thereof which extend through correspondingly shaped slots provided in the vertical legs 60 and 62 of frame 30. The central portion of bar 80 is provided with a pair of vertically spaced slits 84 and 86 extending lengthwise of bar 80 and forming a relatively narrow intermediate strip 88. When the slits 84 and 86 have been made in bar 80 the central portion thereof and the narrow strip 88 are bent away from each other to form an opening therebetween for receiving valve stem 52, as shown more particularly in Figs. 3 and 4. This provides a relatively simple and economic structure and also one wherein the valve stem is held against undue vibration. In order to properly condition the thermostat for operation, the tube with disc 76 is inserted in position before the mechanism is assembled as shown in Figs. 2 to 4. Pressure is then applied to the upper bellows 68 causing full compression thereof and partial compression of bellows 56, as shown in Fig. 2. Tube 72 is adjusted until the space between disc 76 and the lower end of valve stem 52 represents maximum permissible expansion of upper bellows 68. Tube 72 is then soldered to the upper surface of the movable head 70 of the bellows 68 as shown at 90. The air is now evacuated from the lower and upper bellows 56 and 68 and the passage in the valve stem 52, and the said upper bellows is then fully compressed, as shown in Fig. 1. A thermostatic liquid which may comprise a mixture of acetone and isopropyl alcohol is then caused to flow into the bellows 56 through tube 72 until the said bellows 56, the communicating passage 74 in valve stem 52, and the bellows 68 are completely filled. When the filling operation has been completed the end of tube 72 is pinched closed as shown at 92 and soldered to prevent the escape of fluid from or air leakage into the interior of the bellows. Filling of the bellows takes place at a temperature of substantially 80° F. and the thermostatic fluid is so proportioned that it remains in a liquid state until the desired start to open temperture is attained. A start to open temperature of approximately 160° has been found to be desirable in certain installations although the thermostatic liquid might be of such composition as to cause the valve to start to open at other desired temperatures.

Should the pressure of the coolant in the system remain at atmospheric pressure as would be the case if no pressure relief valve were provided, the valve element 46 would begin to open at approximately 160° F. By providing a compensating bellows 68 at the upper end of the valve it is seen that due to the difference in compressions of the bellows 68 and 56, the former will expand first and the latter will not expand until the compressions of the two bellows have become substantially balanced. When this balanced condition has been attained, the bellows 56 and 68 expand in unison causing the latter to actuate valve 46 toward open position. It is apparent that by the provision of compensating bellows 68, the expansion of the liquid throughout the temperature range of from substantially 80° F. to 160° F. will be absorbed and the valve element 46 will begin to open only when the highest temperature of this range is exceeded. An accurate opening of the valve 46 may thus be obtained.

When the valve mechanism is applied in a coolant system including a pressure cap allowing for the development of an ambient pressure, say of 13 pounds, for example, element 46 will still unseat at the predetermined temperature of 160° F. by reason of the compensating bellows 68. Thus, during the temperature increase within the range below 160° F., the lower bellows, just as before, remains in the state illustrated by Figures 2 and 3, while the upper bellows expands. The increased resistance to the expansion of the upper bellows owing to the increased ambient pressure is reflected in a substantially corresponding increase in the pressure within the lower bellows, this by virtue of the passageway between the bellows. In other words, the pressure within the lower bellows and the ambient pressure become equalized so that the start to open temperature remains the same. Since at such temperature, the spring rates of the two bellows are equal, the compensating effect of the upper bellows is lost, with the result that the element 46 is not raised to wide open position until the ambient temperature is of the order of 214° F. (as against 175° F. in the case of a system not including a pressure cap). However, this change in the wide open temperature is of no consequence, considering that the cooling index for vehicles with pressure caps is based on a coolant operating temperature of from 222° F. to 230° F. It will be understood, of course, that the resistance of the bellows themselves increases progressively as the bellows approach maximum expansion. With the spring rates of the bellows as contemplated, this increased resistance will in any case account for 15° F. of the difference between the start to open temperature and the wide open temperature.

With the valve mechanism disposed in a pressure system, the increased pressure tends neither to unseat the element 46 nor to maintain the same seated. In this connection it is noted that the effective area of the movable head 54 of bellows 56 is the same as that of the undersurface of the valve elements 46, a condition precluding displacement of the element by the ambient pressure. It is further noted that the undersurface of the bellows head 54 has an effective area equivalent to that of the outer surface of the head of the upper bellows. Accordingly, any pressure increase within the lower bellows resulting from the force of the ambient pressure on the head of the upper bellows acts against the undersurface of the head 54 to counteract any tendency of the ambient pressure to hold the element 46 on its seat.

What is claimed is:

1. A pressure compensating valve mechanism, comprising, a supporting frame, a valve seat provided on said frame, a valve element normally engaging said seat, a spring bellows mounted on said frame for actuating said valve element toward open position when the temperature to which said bellows is subjected exceeds a predetermined value, a second spring bellows mounted on said valve element, a stem connecting said first bellows to said valve element having a communicating passage therein connecting the interiors of said first and second bellows, a thermostatic liquid completely filling said first and second bellows and said communicating passage, whereby any pressure imposed on said second bellows tending to actuate said valve in one direction is communicated to said first bellows causing an equal and opposite pressure to be imposed on said valve by said first bellows tending to move said valve in the opposite direction.

2. A pressure compensating valve mechanism, comprising, a supporting frame, a valve seat provided on said frame, a valve element normally engaging said seat, a spring bellows mounted on said frame for actuating said valve element toward open position when the temperature to which said bellows is subjected exceeds a predetermined value, a second spring bellows mounted on said valve element, a stem connecting said first bellows to said valve element having a communicating passage therein connecting the interiors of said first and second bellows, a thermostatic liquid completely filling said first and second bellows and said communicating passage, said liquid being of such composition as to remain in a liquid state throughout a predetermined temperature range and which begins to vaporize when said range is exceeded, whereby any pressure on said second bellows tending to close said valve while the temperature of said liquid is within said range is communicated to said first bellows causing an equal and opposite force to be imposed on said valve by said first bellows tending to open said valve, and the spring rate of said second bellows being normally greater than that of said first bellows an amount corresponding to the expansion of said liquid within said temperature range, whereby said valve is actuated toward open position only when the temperature of said liquid exceeds the highest value of said temperature range.

3. A compensating valve mechanism, comprising, a supporting frame, a valve seat provided on said frame, a valve element normally engaging said seat, a normally partially compressed spring bellows mounted on said frame for actuating said valve element toward open position when the temperature to which said bellows is subjected exceeds a predetermined value, a thermostatic liquid completely filling said bellows of such composition as to remain in substantially a liquid state throughout a predetermined temperature range and which begins to vaporize when said temperature range is exceeded, and means for absorbing the expansion of said thermostatic liquid throughout said temperature range, whereby actuation of said valve element toward open position by said bellows begins substantially only when the temperature to which the latter is subjected exceeds the highest temperature of said predetermined range, said last mentioned means comprising, a second spring bellows mounted on said valve element, means establishing communication between said first and second bellows, said thermostatic liquid also normally completely filling said second bellows and said communication establishing means, and said second bellows being normally compressed an amount greater than the compression of said first bellows corresponding to the extent of expansion of said thermostatic liquid throughout said predetermined temperature range.

4. The structure set forth in claim 3 including means for adjusting the tensions of said first and second bellows.

5. The structure set forth in claim 3 including means for adjusting said valve seat toward and away from said valve element.

6. The structure set forth in claim 3 including a valve stem operatively connecting said valve element to said first mentioned bellows, and means on said valve stem and said valve element for adjusting the latter toward and away from said seat.

7. The structure set forth in claim 3 including means for adjusting said valve seat toward and away from said valve element, a valve stem operatively connecting said valve element to said first mentioned bellows, and interengaging means on said valve stem and valve element for adjusting the latter toward and away from said seat.

8. The structure set forth in claim 3 including threaded means on said frame and said valve seat for adjusting the latter toward and away from said valve element, and threaded means on said valve stem and said valve element for adjusting said valve element toward and away from said seat.

9. A compensating valve mechanism, comprising, a supporting frame, a valve seat provided on said frame, a valve element normally engaging said seat, a normally tensioned expansible member mounted on said frame for actuating said valve element toward open position when the temperature to which said member is subjected exceeds a predetermined value, a thermostatic liquid completely filling said expansible member of such composition as to remain substantially in a liquid state throughout a predetermined temperature range and which begins to vaporize when said temperature range is exceeded, and means for absorbing the expansion of said thermostatic liquid throughout said predetermined temperature range whereby actuation of said valve element toward open position by said expansible member begins substantially only when the temperature to which the latter is subjected exceeds the highest temperature of said predetermined temperature range, said last mentioned means comprising, a second tensioned expansible member mounted on said valve element, means establishing communication between said first and second expansible members, said thermostatic liquid also normally completely filling said expansible member and said communication establishing means, and said second expansible member being tensioned an amount greater than said first expansible member corresponding to the extent of expansion of said thermostatic liquid throughout said predetermined temperature range.

10. A compensating valve structure, comprising, a supporting frame, a valve seat provided on said frame, a valve element adapted to engage said seat, a spring bellows mounted on said frame and normally tensioned to a predetermined value, a second spring bellows mounted on said valve element and normally tensioned to a predetermined value greater than that of said first mentioned bellows, an expansible liquid normally completely filling said first and second bellows and remaining in a liquid state throughout a predetermined temperature range, means connecting said valve element to said first mentioned bellows for actuation by the latter, and communicating passage means connecting the interiors of said first and second bellows, whereby expansion of said liquid first causes expansion of said second bellows only until the tension of said first and second bellows becomes substantially equalized when both of said bellows thereafter expand in unison causing said first bellows to actuate said valve element toward open position.

11. A compensating valve structure, comprising, a supporting frame, a valve seat mounted on said frame, a valve element normally engaging said seat, a spring bellows mounted on said frame and normally compressed a predetermined amount, a second spring bellows mounted on said valve and compressed a predetermined amount greater than the compression of said first bellows, a valve stem connecting said valve element to said first bellows and having a passage therein establishing communication between said first and second bellows, and an expansible liquid completely filling said first and second bellows and said passage, said liquid being of such composition as to remain in liquid form throughout a predetermined temperature range and to vaporize when the highest temperature of said range is exceeded, whereby the expansion of said liquid during said predetermined temperature range is absorbed by said second bellows and said valve element is opened by said first bellows only when the highest temperature of said range is exceeded.

12. The structure set forth in claim 11 including adjustable means for varying the compression of said first and second bellows.

13. A compensating valve structure, comprising, a supporting frame, a valve seat mounted on said frame, a valve element normally engaging said seat, a spring bellows mounted on said frame and normally compressed a predetermined amount, a second spring bellows mounted on said valve and compressed a predetermined amount greater than the compression of said first bellows, a valve stem connecting said valve element to said first bellows and having a passage therein establishing communication between said first and second bellows, and an expansible liquid completely filling said first and second bellows and said passage, said liquid being of such composition as to remain in liquid form throughout a predetermined temperature range and to vaporize when the highest temperature of said range is exceeded, the highest temperature of said range corresponding to the start to open temperature of said valve and the difference in compression of said first and second bellows corresponding substantially to the expansion of said liquid throughout said predetermined temperature range, whereby the said expansion of said liquid is imparted only to said second bellows causing expansion of the latter until the compression of said first and second bellows becomes substantially equal, whereupon further expansion due to vaporization of said liquid then actuating both of said bellows causing said first bellows to move said valve toward open position.

14. A compensating valve mechanism, comprising, a fixed support, a fixed valve seat, a valve element adapted to engage said seat, an expansible and contractible member mounted on said support and operatively connected to said valve element for actuating the latter to open position when the temperature to which it is subjected exceeds a predetermined value and to closed position when said temperature falls below said predetermined value, a thermostatic liquid completely filling said expansible member of such composition as to remain in a liquid state throughout a predetermined temperature range and which begins to vaporize when said temperature range is exceeded, and means for absorbing the expansion of said liquid whereby actuation of said valve element to open position by said first expansible and contractible member begins only when said liquid vaporizes, said last mentioned means comprising a second expansible and contractible member mounted on said valve element, and normally contracted to a greater extent than said first member, said thermostatic liquid completely filling said second member, and means providing a passage between said first and second members to permit liquid flow therebetween.

15. A compensating valve mechanism, comprising, a fixed support, a fixed valve seat, a valve element adapted to engage said seat, an expansible and contractible member having a thermostatic fluid therein mounted on said support and operatively connected to said valve element for actuating the latter to open position when the temperature to which said expansible member is subjected exceeds a predetermined value and to closed position when said temperature falls below said value, and means for balancing the ambient pressure on said valve, said last mentioned means comprising a second expansible and contractible member having a thermostatic fluid therein mounted on said valve element, and means establishing fluid communication between said first and second mentioned expansible members.

16. A compensating valve mechanism, comprising, a supporting frame, a fixed valve seat, a valve element adapted to engage said seat, an expansible and contractible bellows having a thermostatic fluid therein mounted on said frame and operatively connected to said valve element for actuating the latter to open position when the temperature to which said bellows is subjected exceeds a predetermined value and to seated position when the temperature falls below said predetermined value, and means for balancing the ambient pressure on said valve, said last mentioned means comprising a second expansible and contractible bellows having a thermostatic fluid therein mounted on said valve element, a thermostatic fluid provided in said first and second bellows, and means establishing fluid communication between first and second bellows.

References Cited in the file of this patent

UNITED STATES PATENTS

| | | |
|---|---|---|
| 2,032,069 | Radford | Feb. 25, 1936 |
| 2,408,269 | Peterson | Sept. 24, 1946 |